March 4, 1947.  J. H. COOMBES  2,416,820
BRAKE ARRANGEMENT
Filed Nov. 25, 1944
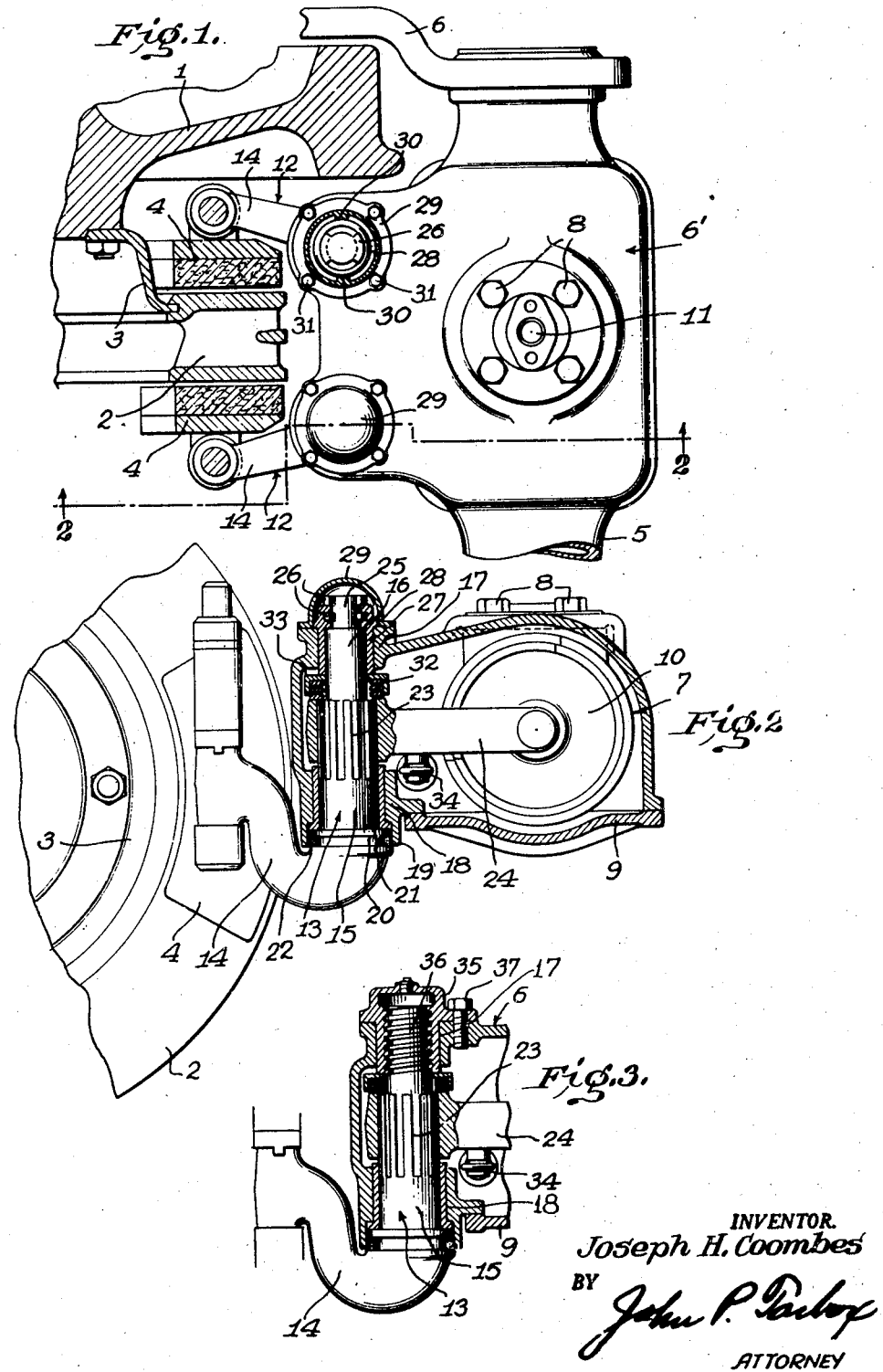
INVENTOR.
Joseph H. Coombes
BY
ATTORNEY Patented Mar. 4, 1947

2,416,820

UNITED STATES PATENT OFFICE 2,416,820

BRAKE ARRANGEMENT

Joseph H. Coombes, Detroit, Mich., assignor to The Budd Company, Philadelphia, Pa., a corporation of Pennsylvania Application November 25, 1944, Serial No. 565,074

8 Claims. (Cl. 188—59)

The invention relates to a brake mechanism and more particularly to such a mechanism applied to vehicles, such as railway trucks.

The invention is concerned more particularly with such a brake mechanism in which most of the brake levers and their actuating cylinders are enclosed within a closed housing.

It is object of the invention to provide a sturdy such construction, one in which the parts can be readily manufactured and assembled and in which the parts enclosed within the casing are readily accessible and removable for replacement or repair.

It is a further object of the invention to make the brake levers so that they can be readily assembled and easily secured in place in assembled relation with the housing by quick detachable means.

Other and further objects and advantages and the manner in which they are attained will become apparent from the following detailed description when read in connection with the drawings forming a part hereof.

In the drawings:

Fig. 1 is a fragmentary plan view, parts being broken away and shown in section, of a brake mechanism according to the invention;

Fig. 2 is a vertical longitudinal sectional view taken substantially along the line 2—2 of Fig. 1 and;

Fig. 3 is a fragmentary sectional view similar to Fig. 2, showing a modification.

In the embodiment of the invention selected for illustration, numeral 1 designates a rail car wheel to which the brake is applied, and 2 designates a rotary brake disc or ring mounted on a support web 3 which is bolted to the hub of the wheel in concentric relation thereto.

The opposite faces of the disc 2 provide braking faces in cooperative relation with which are disposed the brake shoes 4, 4, which are shown of segmental form.

The support for the shoes is shown as comprising a transverse member 5 whose ends are provided with longitudinally extending arms, as 6, suitably supported on a portion of the truck with which the wheel 1 is associated. Suitable connections (not shown) are provided between the transverse member 5 and the truck frame to take the braking torque.

Opposite the brake disc 2, the transverse member is expanded both vertically and longitudinally to form an enlarged housing, designated generally by numeral 6', the walls of this housing completely enclosing a brake cylinder actuator 7 which may be removably secured to the top of the housing by bolts 8 and be removable through the bottom of the housing through an opening normally closed by a cover 9.

This cylinder actuator carries pistons, as 10, which are adapted to be forced apart to actuate the brake levers about to be described by admitting compressed fluid through the port 11, shown in Fig. 1.

To provide a sturdy construction of the brake levers designated generally 12, 12, and to facilitate the sealing of the housing at these pivots, their pivot portions, as 13, are made integral with their arms 14 extending outside the housing and pivotally supporting the respective shoes 4. To facilitate the assembly of the combined pivot portion 13 and arm 14 with the housing, the pivot portion is formed with a lower large diameter bearing portion 15 and an upper smaller diameter portion 16 fitting, respectively, the bushed bearings 17 and 18 formed, respectively, in the top and bottom walls of the housing 6'. A skirt 19 depends from the bottom bearing 18 and surrounds a groove 20 formed in an enlarged portion forming a shoulder 21 between it and pivot bearing portion 15. The groove 20 is preferably filled with a suitable packing 22 to seal the space between it and the depending skirt.

Intermediate the top and bottom bearing portions of the pivot 13, it is formed with a splined portion 23 which engages a correspondingly splined opening in the hub of the lever arm 24 extending into the housing and having its free end in abutting relation with the associated piston of the cylinder actuator.

The extreme upper end of the pivot portion 13 of the lever projects above the bearing 17 and is there formed with a reduced extension 25 carrying interrupted annularly arranged shoulders, as 26, which cooperate with similar shoulders on the upper bearing bushing 27 also extended above the bearing 17 to secure the lever pivot in place, when the bearing bushing is rotated through a quarter revolution. This lock operates similarly to a bayonet-type lock and provides a quick attachable or detachable means for locking the lever pivot in place, or for releasing it. The bushing 27 is formed with a shoulder 28 engaging the end of the bearing 17 to take the end thrust on the pivot, when the brakes are applied and the disc is turning in clockwise direction as seen in Fig. 2. The end thrust in the opposite direction is taken by the shoulder 21 bearing against the end of the bottom bearing 18.

To lock the upper bearing bushing 27 in place and to seal the upper bearing 17, a cap 29, provided with splines 30 engaging corresponding grooves in the shouldered portion of the bearing bushing, is secured, as by bolts 31, to the machined end face of the bearing 17.

To prevent rattle of the parts a spring 32 partially enclosed by a cup washer 33 is preferably inserted between the upper bearing bushing 27 and the hub of the lever arm 24.

From the foregoing description it will be seen that the lever pivot and shoe can be readily disassembled when desired, by first removing the cap 29 and then turning the bushing 27 through a quarter of a revolution, when these parts can be dropped downwardly from the casing, the splined hub of arm 24, in this procedure, slipping off the pivot. The parts can be as readily assembled in reverse order.

To actuate the levers to their inoperative position, a return spring, as 34, may connect the inwardly projecting arms 24 within the housing.

The modified construction shown in Fig. 3 is in all respects like that shown in the preferred form except that the upper bearing bushing 35 itself forms the closing cap and has a long threaded extension within the upper bearing 17 which engages a correspondingly threaded bearing portion 36 on the upper end of the pivot portion of the lever. The threads are of such slight pitch, that the required rotary movement of the pivot to apply the brakes, does not appreciably raise or lower the pivot. The bearing bushing is held locked against rotation by a screw 37. To disassemble the lever from the housing, all that is required is to remove the screw 37 and rotate the bushing 35 until its threads are disengaged from the threads of the pivot, when the parts can be downwardly withdrawn from the housing as in the preferred form.

While several specific embodiments of the invention have been herein described, it will be understood that changes and modifications may be made by those skilled in the art, without departing from the main features of the invention, and such changes and modifications are intended to be covered by the appended claims.

What is claimed is:

1. In a brake arrangement, a support comprising a closed housing having spaced bearings in opposite walls thereof, and a brake lever pivotally supported in said spaced bearings, said lever comprising an arm extending outside the housing for cooperation with a non-rotary brake element and a pivot portion engaging said bearings and integral with said arm, and a second arm non-rotatably but slidably secured to the pivot portion between said bearings and extending within the housing for cooperation with an actuator, the bearing remote from said first-named arm being provided with quick detachable means accessible from the exterior of the housing for securing said pivot portion in operative relation with the housing.

2. In a brake arrangement, a support comprising a closed housing having spaced bearings in opposite walls thereof, a brake lever pivotally supported in said bearings, said lever comprising an arm extending outside the housing for cooperation with a non-rotary brake element and a pivot portion engaging said bearings and integral with said arm, the pivot portion having a shoulder thereon providing end thrust engagement with the bearing adjacent said arm for transmitting braking torque to the support, and a quick detachable connection between said pivot portion and the remote bearing including interengaging shoulders providing end thrust engagement between the pivot portion and said remote bearing for transmitting braking torque to the support.

3. In a brake arrangement, a support comprising a closed housing having spaced bearings in opposite walls thereof, a brake lever having a pivot portion engaging said bearings and arms extending from said pivot portion, one without and one within said housing, and a quick detachable means for locking the pivot portion in position associated with one of said bearings only and comprising interengaging shoulders on the pivot portion and said one of the bearings arranged to transmit end thrust from said pivot portion due to the braking torque to said housing.

4. In a brake arrangement, a support comprising a closed housing having spaced bearings in opposite walls thereof, a brake lever having a pivot portion engaging said bearings and arms extending from said pivot portion, one without and one within said housing, and a quick detachable means for locking said pivot portion in position, said quick detachable means comprising circumferentially interrupted shoulders on the pivot portion and one of said bearings, respectively.

5. In a brake arrangement, a support comprising a closed housing having spaced bearings in opposite walls thereof, a brake lever having a pivot portion engaging said bearings and arms extending from said pivot portion, one without and one within said housing, and a quick detachable means for locking said pivot portion in position in the housing, said means comprising a bushing in one of said bearings having an elongated screw thread of low pitch engaging a corresponding screw thread on the pivot portion.

6. In a brake arrangement, a support comprising a closed housing having spaced bearings in opposite walls thereof, a brake lever having a pivot portion engaging said bearings and having a shoulder thereon providing end thrust engagement with one of said bearings, the other of said bearings comprising a rotatable bushing having interlocking engagement with said pivot portion, when rotated a predetermined extent, to take the end thrust of said pivot portion in the opposite direction from the end thrust taken by said shoulder, and means for locking said bushing against rotation.

7. In a brake arrangement, a support comprising a closed housing having spaced bearings of different diameters in the opposite walls thereof, a brake lever having a pivot portion engaging said bearings and having a shoulder thereon providing end thrust engagement with the larger of said bearings, the smaller of said bearings comprising a rotatable bushing having interlocking engagement with said pivot portion, when rotated a predetermined extent, to take the end thrust of said pivot portion in the opposite direction from the end thrust taken by said shoulder, an arm splined to said pivot portion intermediate said bearings, and resilient means interposed between said arm and said rotatable bushing.

8. In a brake arrangement, a support comprising a closed housing having spaced bearings in opposite walls thereof, a brake lever having a pivot portion engaging said bearings and having a shoulder thereon providing end thrust engagement with one of said bearings, the other of said bearings comprising a rotatable bushing having interlocking engagement with said pivot portion, when rotated a predetermined extent, to take the end thrust of said pivot portion in the opposite direction from the end thrust taken by said shoulder, and means comprising a bearing sealing cap for locking said bushing against rotation.

JOSEPH H. COOMBES.

REFERENCES CITED

The following references are of record in the file of this patent:

UNITED STATES PATENTS

| Number | Name | Date |
| --- | --- | --- |
| 2,011,411 | Kindler | Aug. 13, 1935 |
| 1,940,845 | Conner et al. | Dec. 26, 1933 |